US007454316B2

(12) United States Patent
Bose et al.

(10) Patent No.: US 7,454,316 B2
(45) Date of Patent: Nov. 18, 2008

(54) METHOD AND APPARATUS FOR MONITORING AND ENHANCING ON-CHIP MICROPROCESSOR RELIABILITY

(75) Inventors: Pradip Bose, Yorktown Heights, NY (US); Jude A. Rivers, Cortlandt Manor, NY (US); Jayanth Srinivasan, Urbana, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/961,613

(22) Filed: Oct. 8, 2004

(65) Prior Publication Data

US 2006/0080062 A1  Apr. 13, 2006

(51) Int. Cl.
G06F 11/30  (2006.01)
G21C 17/00  (2006.01)

(52) U.S. Cl. ..................................... 702/186
(58) Field of Classification Search .............. 702/1, 702/81–84, 179–186; 714/1; 326/9
See application file for complete search history.

(56) References Cited

U.S. PATENT DOCUMENTS

| 5,497,076 | A |  | 3/1996 | Kuo et al. |  |
|---|---|---|---|---|---|
| 5,847,966 | A |  | 12/1998 | Uchino et al. |  |
| 5,999,466 | A | * | 12/1999 | Marr et al. | 365/201 |
| 6,363,515 | B1 |  | 3/2002 | Rajgopal et al. |  |
| 6,532,570 | B1 |  | 3/2003 | Mau |  |
| 6,721,447 | B1 | * | 4/2004 | Kim et al. | 382/162 |
| 6,771,175 | B1 | * | 8/2004 | Eagle et al. | 340/573.1 |
| 2005/0257078 | A1 | * | 11/2005 | Bose et al. | 714/1 |

FOREIGN PATENT DOCUMENTS

| JP | 08-030493 | * | 2/1996 |
| JP | 2004-102130 | * | 2/2004 |

OTHER PUBLICATIONS

U.S. Appl. No. 10/829,741, filed Apr. 22, 2004, Bose et al.
D. Brooks et al., New methodology for early-stage, microarchitecture-level power-performance analysis of microprocessors, IBM Journal, R & D, jVol. 47 No. 5/6, Sep./Nov. 2003; pp. 653-670.
K. Skadron et al., Temperature-Aware Microarchitecture, Proc. 303th Ann. Int'l Symp on Computer Architecture, 2003, pp. 1-12.
J. Srinivasan, et al., RAMP: a model for reliability aware microprocessor design, IBM Confidential Research Report, Sep. 2003, pp. 1-25.
Assessing Product Reliability, Chapter 8, NIST/SEMATECH e-Handbook of Statistical Methods. In http://www.itl.nist.gov/div898/handbook/ 238 pages; Jun. 2003.

* cited by examiner

*Primary Examiner*—Michael P Nghiem
(74) *Attorney, Agent, or Firm*—Keusey, Tutunjian & Bitetto, P.C.; Kevin Jordan

(57) ABSTRACT

A system and method for projecting reliability to manage system functions includes an activity module which determines activity in the system. A reliability module interacts with the activity module to determine a reliability measurement for the module in real-time based upon the activity and measured operational quantities of the system. A management module manages actions of the system based upon the reliability measurement input from the reliability module. This may be to provide corrective action, to reallocate resources, increase reliability of the module, etc.

21 Claims, 6 Drawing Sheets

310

| ACTIVE | SAVINGS | SPEED / RESOURCE | UP | DOWN |
|--------|---------|------------------|----|----|
| 1 | 1 | HIGH | 0 | 1 |
| 1 | 0 | NOMINAL | 0 | 0 |
| 0 | x | LOW | 1 | 0 |

FIG. 4

METHOD AND APPARATUS FOR MONITORING AND ENHANCING ON-CHIP MICROPROCESSOR RELIABILITY

BACKGROUND OF THE INVENTION

1. Field of the Invention

The present invention relates to a systematic, method and apparatus for reliability monitoring and, more particularly, to a finite state machine as part of a microprocessor chip and used to control and enhance the reliability and/or the performance of the microprocessor system. The present invention further relates to the ability to capture the manner in which mean time to failure (MTTF) varies as a function of the input workload executing on the microprocessor or microprocessor-based system and using this information in either enhancing reliability or boosting microprocessor performance.

2. Description of the Related Art

Advances in semiconductor (specifically, complementary metal oxide semiconductor (CMOS)) technology have been improving microprocessor performance steadily over the past few decades. However, such advances accelerate the onset of reliability problems. Specifically, one of the consequences of progressive scaling of device and interconnect geometries is the increase in average and peak power densities (and hence temperatures) across the chip.

The inherent increase in static (leakage) power with scaling into the deep sub-micron region, adds to these issues. In addition, the major components of leakage power increase with temperature, making the problem even harder to control. Despite advances in packaging and cooling technologies, it is an established concern, that the average and peak operating temperatures within key units inside a microprocessor chip will be higher with the progressive scaling of technology.

Already, to protect against thermal runaways, microprocessors (e.g., INTEL® Pentium 4™ and IBM® POWER5™) have introduced on-chip temperature monitoring devices, with mechanisms to throttle the processor execution speeds, as needed. The objective is to reduce on-chip power when maximum allowable temperatures are approached or exceeded.

Failure rates of individual components making up an integrated circuit (or a larger system) are fundamentally related to operating temperatures, i.e., these rates increase with temperature. As such, chips or systems designed to operate at a given average temperature range, are expected to fail sooner than specified, if that range is routinely exceeded during normal operating conditions.

Conversely, consider a case where a chip or system is designed to meet a certain mean time to failure (MTTF), at an assumed maximum operating temperature. In this case, the designed chip or system will be expected to have a longer lifetime, if the actual operating temperatures happen to be lower. Thus, it may be possible to "overclock" (or speed up) the processor during phases of the workload when the operating power and temperature values are well below the maximum temperatures assumed during the projection of expected MTTF.

Electromigration and stress migration effects in the chip interconnects are major sources of failures in a chip and, they both have a direct dependence on operating temperature. However, aspects of reliability degradation with CMOS scaling, are not solely due to the power and temperature implications. For example, time-dependent dielectric breakdown (TDDB) is an extremely important failure mechanism in semiconductor devices. With time, the gate dielectric wears down and fails when a conductive path forms in the dielectric.

With CMOS scaling, the dielectric thickness is decreasing to the point where it is only tens of angstroms. Coupled with the fact that there has been a general slowdown in the way the supply voltage is scaling down, the intrinsic failure rate due to dielectric breakdown is expected to increase.

Furthermore, TDDB failure rates also have a very strong temperature dependence. Thermal cycling effects, caused by periodic changes in the chip temperature are another factor that degrades reliability. Again, this factor is not directly related to the average operating temperature; rather, it is a function of the number of thermal cycles that the chip can go through before failure.

Since the power consumed by the chip (or system) varies with the executing workload, it is clear that the actual operating temperature and failure rate of a component (and hence of the system) depend on the workload.

SUMMARY OF THE INVENTION

A reliability calculator and monitoring system that can be located on a microprocessor chip is disclosed. During program run or workload execution, it can collect information and estimate chip wide reliability by aggregating together the individual structures' reliability values for the various parts of the microprocessor floorplan.

The prior art lacks disclosure of workload-dependent variability of failure rates and overall MTTF of a microprocessor which is projected or estimated during program run and such transient or average reliability information is used to control the operation of the microprocessor. Currently, no online reliability assessments can be done for a chip after it is shipped. Traditionally, reliability assessments are done only at the back-end technology qualification stage and once a design is qualified no further steps are taken to equip a given released chip from susceptibility to reliability degradation and failures.

With the possible emergence of external hardware system attacks from thermal viruses (e.g. a piece of code written to exhaustively exercise an individual structure like a functional unit on-chip), the reliability of various on-chip structures of a microprocessor core can be stretched beyond their electromigration, gate-oxide breakdown, stress migration, and thermal cycling-tolerable limits, thereby leading to the failure of the chip.

An aspect of the present invention includes the adoption of a step-by-step methodology, based on fundamental formulations in the physics of temperature-sensitive degradation of chip reliability factors, of workload-dependent variation of failure rates and mean time to failure. Another aspect of this invention includes the adoption of a step-by-step methodology, based on fundamental formulations in the physics of CMOS technology scaling and temperature-insensitive degradation of chip reliability factors, of workload- and CMOS generation-dependent variation of failure rates and mean time to failure.

A system and method for projecting reliability to manage system functions includes an activity module which determines activity in the system. A reliability module interacts with the activity module to determine a reliability measurement for the module in real-time based upon the activity and measured operational quantities of the system. A management module manages actions of the system based upon the reliability measurement input from the reliability module. This may be to provide corrective action, to reallocate resources, increase reliability of the module, etc.

The present invention incorporates these methods in a computer module that can be integrated in a microprocessor for deriving the transient and steady-state reliability of a given microprocessor chip and using such information to control the operation of the microprocessor to enhance its overall reliability and/or boost performance.

Another aspect of the present invention is the implementation of variations of the methods in on-chip hardware controls that can be used to manage the microprocessor's power consumption (and performance) in response to changes in the projected reliability metrics of individual units or components, over time and as a function of the input workload.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein:

FIG. 4 is a truth table of the "signals states" of the preferred embodiment shown in FIG. 3;

DETAILED DESCRIPTION OF PREFERRED EMBODIMENTS

Figure 1:
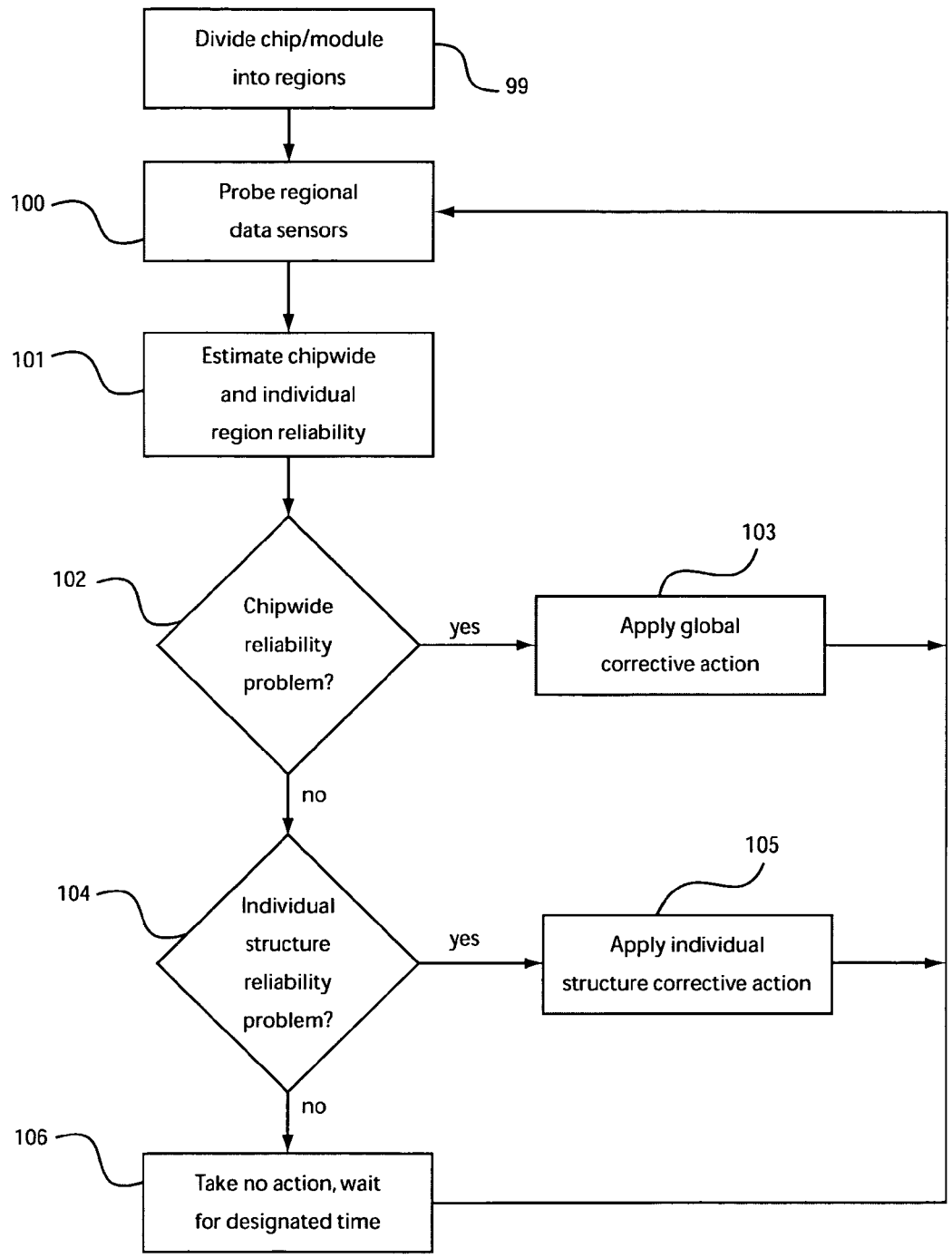
FIG. 1 is a block/flow diagram for a system/method for evaluating and managing reliability of a chip/module in accordance with one illustrative embodiment of the present invention.

The present invention includes systematic methods and devices for putting together a reliability monitoring and reliability enhancing system. The device may be implemented as a finite state machine as part of a microprocessor chip, and the method of use may be implemented to control and enhance the reliability of the microprocessor system.

With one-time only late-stage evaluation capability (which represents current state-of-the-art), microprocessor designs are likely to encounter post-silicon surprises in terms of severely reduced reliabilities that may cause a product to be prematurely withdrawn from the marketplace, for example. The present invention provides a "self-healing" mechanism (preferably, on-chip) that can help detect potential failure behavior and respond with a corrective action. In addition, the apparatus can also be used to raise and improve processor performance in situations where the microprocessor is operating below the temperature/power/reliability that it was designed for.

The present invention also offers the microprocessor designer the opportunity to design without hard and strict temperature guard band limits, hence reducing the cost of design.

In one aspect of the present invention, a microarchitecture-level reliability finite state machine is provided for dynamically estimating on-chip reliability, embodied in the form of either a software or hardware module, that is integrated as part of the microprocessor chip and is used to monitor and enhance the reliability of a microprocessor.

One embodiment either dynamically or a-priori divides the whole on-chip floorplan into a finite number of individual discrete structures or regions. Each individual region or structure potentially covers one or more functional units or other logic or memory structures on-chip. The individual regions or structures are each equipped with on-chip data sensors (for gathering instructions per cycle (IPC)/activity, power, and/or temperature data) that can be probed periodically to ascertain instant (transient or steady-state) respective values of the corresponding individual region or structure on chip.

The device in accordance with the present invention will periodically sample on-chip individual region/structure sensors during workload execution and use these individual regional/structure values in collaboration with other embedded reliability determinants to estimate individual regional/structure and chip-wide reliability on the fly.

The resulting reliability estimate(s) are then checked against original kept microprocessor reliability target(s) to ascertain whether or not an individual unit, region and/or structure on chip or the whole chip is degrading in reliability. If it is determined that the reliability of an individual unit, region or structure on-chip is deteriorating or there is the danger of a chip-wide reliability deterioration, the device may kick off one or more various corrective actions.

On the other hand, if it is determined that the processor is well below and within an earlier set acceptable reliability threshold, the device may apply actions to increase or boost the system performance. Based on the capabilities embedded in the design of the microprocessor, examples of these actions may include a triggering mechanism for chip-wide and/or individual region/structure voltage and/or frequency up and down scaling, job migration from one region to another, a slowdown/reduction in work per an affected region/structure, and/or an increase in the amount of work in a chip region/structure.

One major advantage of using the present invention is the ability to dynamically detect potential reliability problems across a chip that is already installed in the field and react to avert a failure due to reliability degradation. The present invention has the potential to work to counteract, e.g., thermal virus hardware breakdown threats on a chip. Another major advantage includes adjustment of a microprocessor's performance upwards in situations where it is found that the microprocessor is running far below a set reliability threshold.

The present invention provides reliability feedback, based on fundamental formulations in the physics of complementary metal oxide semiconductor (CMOS) technology scaling and temperature-insensitive degradation of chip reliability factors, of workload and CMOS generation-dependent variation of failure rates and mean time to failure, to control chip or system reliability and performance.

Some of the known and researched failure mechanisms responsible for CMOS chip reliability include electromigration, stress migration, gate oxide breakdown and thermal cycling. There are many such mechanisms that affect on-chip reliability that are not discussed here in detail, but all such mechanisms can be incorporated in the reliability estimating tool of the present invention as described herein.

Electromigration occurs, especially in aluminum and copper interconnects due to the mass transport of conductor metal atoms in the interconnects. Conducting electrons transfer some of their momentum to the metal atoms of the interconnect. This "electron wind" driving force creates a net flow of metal atoms in the direction of electron flow. As the atoms migrate, there is depletion of metal atoms in one region and pile up in other regions. The depletion sites can see increased interconnect resistance or open circuits, and extrusions can occur at sites of metal atom pile up. Electromigration has an exponential dependence on temperature.

Extensive research has been performed by the material science and semiconductor community on modeling the effects of electromigration, and it is a well understood failure mechanism.

A model used for electromigration includes:

$$MTTF = A\frac{CV}{WH}fpe^{\frac{E_a}{kT}}$$

where A is a proportionality constant, C is the capacitance of the structure, V is the supply voltage, W is the width of interconnects modeled, H is the height of interconnects modeled, f is the operating frequency, p is the activity factor of utilization of the structure, $E_a$ is the activation energy for electromigration, k is Boltzmann's constant, and T is the temperature in Kelvin of the structure.

Much like electromigration, stress migration is a phenomenon where the metal atoms in the interconnects migrate. It is caused by mechanical stress due to differing thermal expansion rates of different materials in a device. A model used for stress migration includes:

$$MTTF = A|T - T_0|^{-n} e^{\frac{E_a}{kT}}$$

where A is a proportionality constant, T is the temperature of the structure, $T_0$ is the stress free temperature or metal deposition temperature, $E_a$ is the activation energy for stress migration, and k is Boltzmann's constant.

Time-dependent dielectric breakdown (TDDB), or gate oxide breakdown, is another failure mechanism in semiconductor devices. The gate dielectric wears down with time, and fails when a conductive path forms in the dielectric. The model used for TDDB includes:

$$MTTF = A\left(\frac{1}{V}\right)^{(a-bT)} e^{(\frac{X+\frac{Y}{T}+ZT}{kT})}$$

where A is a proportionality constant, V is the supply voltage, T is the temperature of the structure, and a, b, X, Y, and Z are fitting parameters.

Temperature cycles can cause fatigue failures. Damage accumulates every time there is a cycle in temperature, eventually leading to failure. Although all parts of the device experience fatigue, the effect is most pronounced in the package and die interface (for example, solder joints). The model used for thermal cycling includes:

$$MTTF = A\left(\frac{1}{T - T_{ambient}}\right)^q$$

where A is a proportionality constant, T is the temperature of the structure, $T_{ambient}$ is the ambient temperature, and q is a structure dependent exponent.

To obtain the overall reliability of a processor, the effects of the above-mentioned different failure mechanisms and other prominent mechanisms not mentioned here are combined across different structures. This includes knowledge of lifetime distributions of the failure mechanisms, and is generally difficult. One model used in the industry is the sum-of-failure-rates (SOFR) model, which makes two assumptions to address this problem: (1) the processor is a series failure system, in other words, the first instance of any structure failing due to any failure mechanism causes the entire processor to fail; and (2) each individual failure mechanism has a constant failure rate (equivalently, every failure mechanism has an exponential lifetime distribution).

The above two assumptions imply (1) the MTTF of the processor, $MTTF_p$, is the inverse of the total failure rate of the processor, $\lambda_p$; and (2) the failure rate of the processor is the sum of the failure rates of the individual structures due to individual failure mechanisms. Hence, $$MTTF_p = \frac{1}{\lambda_p} = \frac{1}{\sum_{i=1}^{j}\sum_{l=1}^{k}\lambda_{il}}$$

where $\lambda_{il}$ is the failure rate of the ith structure due to the lth failure mechanism.

The individual failure mechanism models can be made to provide failure rates for fixed instantaneous operating conditions even though when an application runs, these parameters all vary with time. This variation may be accounted for by: (1) calculating a failure rate based on instantaneous parameters; and (2) using an average over time of these values to determine the actual failure rate for each structure for each failure mechanism when running the application.

It should be understood that the elements shown in the FIGS. may be implemented in various forms of hardware, software or combinations thereof. Preferably, these elements are implemented in a combination of hardware, firmware and/or software on one or more appropriately programmed general-purpose digital computers or solid-state chips, which may include one or more of a processor, memory and input/output interfaces. A module referred to herein may include a chip, system of chips, integrated circuit, printed circuit board or a computer rendered simulation of a chip. Module and chip may be employed synonymously herein. A module may further include a chip design, printed circuit board or a software module in the context of computer implementations.

Referring now to the drawings in which like numerals represent the same or similar elements and initially to FIG. 1, an illustrative overview of the present invention shows aspects of the present invention that can be applied to monitor, balance and enhance on-chip microprocessor reliability. For an on-chip system in accordance with the present invention, a plurality of sensors or feedback devices may employed to take measurements or monitor different characteristics/criteria in real-time. This assumes that various designated structures/regions have been assigned (divided into areas or regions) or created on-chip, making up the full chip, and are equipped with dedicated data sensors in block 99.

Data sensors may include fabricated devices formed on the chip, such as transistors, diodes, capacitors, etc. or structures, such as registers, functional units and even additional chips.

These devices/structure may be designed to measure parameters such as temperature, voltage, workload, frequency, number of operations, etc. As mentioned, these data sensors are used for collecting various data (power, frequency, activity, temperature, etc.), which are fed into a reliability estimating tool or calculator for the purpose of calculating the same.

One approach is described in commonly assigned U.S. patent application Ser. No. 10/829,741, to P. Bose et al., entitled, "SYSTEM AND METHOD OF WORKLOAD-DEPENDENT RELIABILITY PROJECTION AND MONITORING FOR MICROPROCESSOR CHIPS AND SYSTEMS," filed Apr. 22, 2004 and incorporated herein by reference.

It is further assumed that there are available on the chip, various logic and resources that the system can use in making necessary instant decisions and in taking corrective actions. Some of these decisions may be to either improve reliability on various chip regions/structures or globally if it is noted that reliability is deteriorating, or to boost regional or full chip performance if it seen that the system is running far below a given reliability threshold and more performance can be harnessed without negatively impacting reliability. Some corrective actions may be the ability to adjust up and down the global or regional chip voltage, the ability to adjust up or down global or regional chip frequency, the ability to clock-gate or power-gate a given region or structure on chip, and the ability to move computation (job migration) from one section of the chip to another section. In particular, it may be possible to "overclock" (or speed up) the processor during phases of the workload when the reliability estimates are far lower from the expected chip MTTF.

As depicted in FIG. 1, a flow/block diagram shows operations of a chip system in accordance with the present invention having regions divided and equipped with sensors as described above. The system probes regional data sensors in block 100 at pre-designated time intervals. The resulting data is then used by a reliability-estimating tool in block 101 with other preset data to calculate the instantaneous reliability.

With the assistance of preset data and thresholds, the system then determines whether there is a chip-wide reliability problem in block 102. If the determination is yes, then a global corrective action is taken in block 103. It is to be noted that a chip-wide reliability problem here can be considered in a plurality of ways. These may include, for example, either the chip-wide reliability is degrading, for which a corrective action should be taken, or the chip-wide reliability is notably too low, below the system's accepted threshold, again for which a performance boost corrective action may be taken.

In the absence of a chip-wide reliability problem, the system checks for individual structure/regional reliability problems in block 104. If it is determined that such problems exist, then individual structure/regional corrective action may be taken in block 105. If no reliability problem is registered in the present cycle or time period, the system takes no action and goes into a waiting mode to restart for the next invocation period in block 106.

Figure 2:
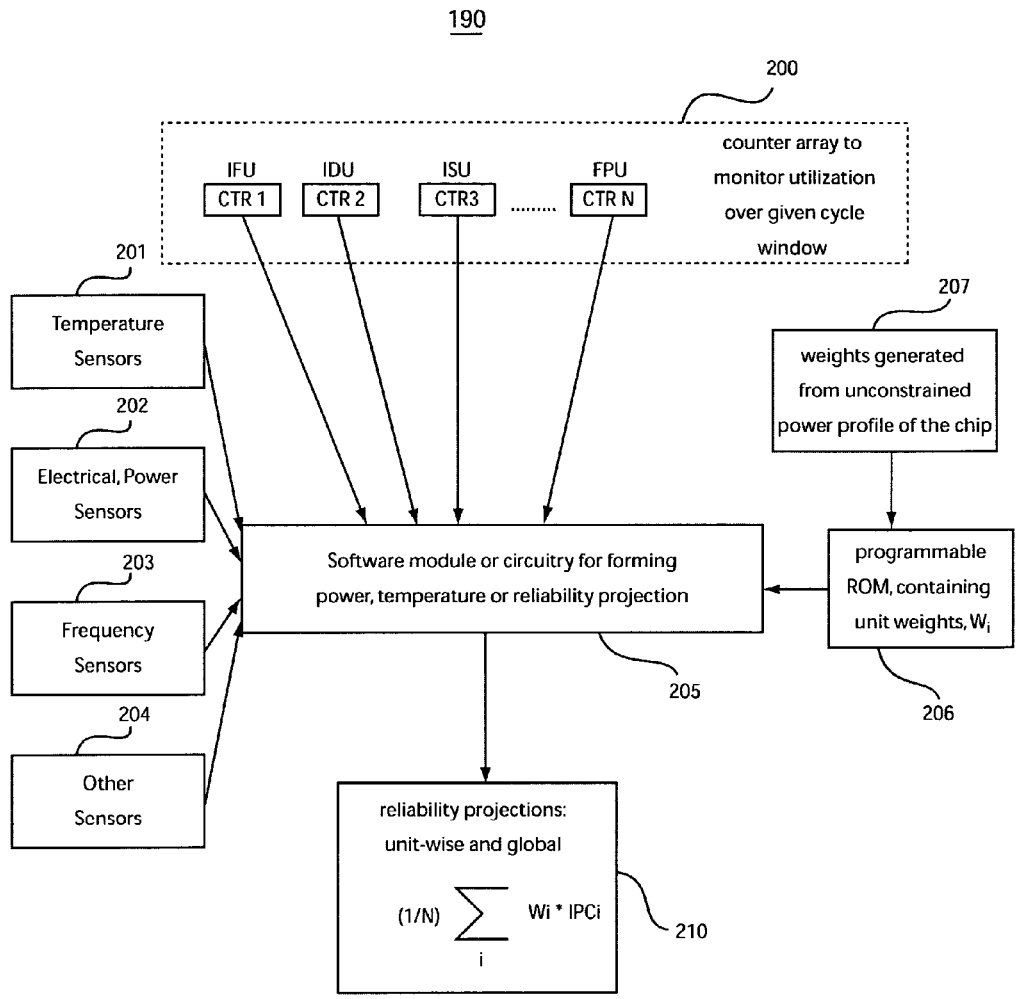
FIG. 2 is a block diagram of one embodiment showing on-chip hardware-based or software-based projection and monitoring, for estimating reliability in accordance with the present invention.

Referring to FIG. 2, a reliability estimating tool or system 190 which may be implemented in hardware, firmware or software is illustratively shown. In one embodiment, on-chip activity is measured by employing functional unit counters CTR 1-N in counter array 200, temperature sensors 201, electrical/power sensors 202, frequency sensors 203 and other sensors 204. With these inputs, on-line real-time reliability calculations can be performed. The temperature, power, activity, etc. factors obtained from the counters CTR in array 200 and sensors 201, 202, 203, 204 can be utilized by on-chip reliability evaluation hardware or circuitry 205 in the equations for individual failure mechanisms for the instantaneous reliability value 210. These calculations may be performed on-chip or the data exported to another chip or device to perform the calculation.

In an alternate embodiment, mechanism 205 may be used as part of an operating system. For example, instead of having on-chip reliability calculation hardware, the readings from temperature sensors 201, electrical/power sensors 202, frequency sensors 203, other sensors 204 and activity counters CTR 200 may be collated by an operating system where a kernel program can calculate processor reliability and output a projection or metric. Unit weights, $W_i$, determined or generated in, for example, an unconstrained power profile of the chip in block 207 may be stored on-chip or off-chip in memory 206, e.g., programmable read-only memory and employed to assist in the calculation of reliability projections.

Figure 3:
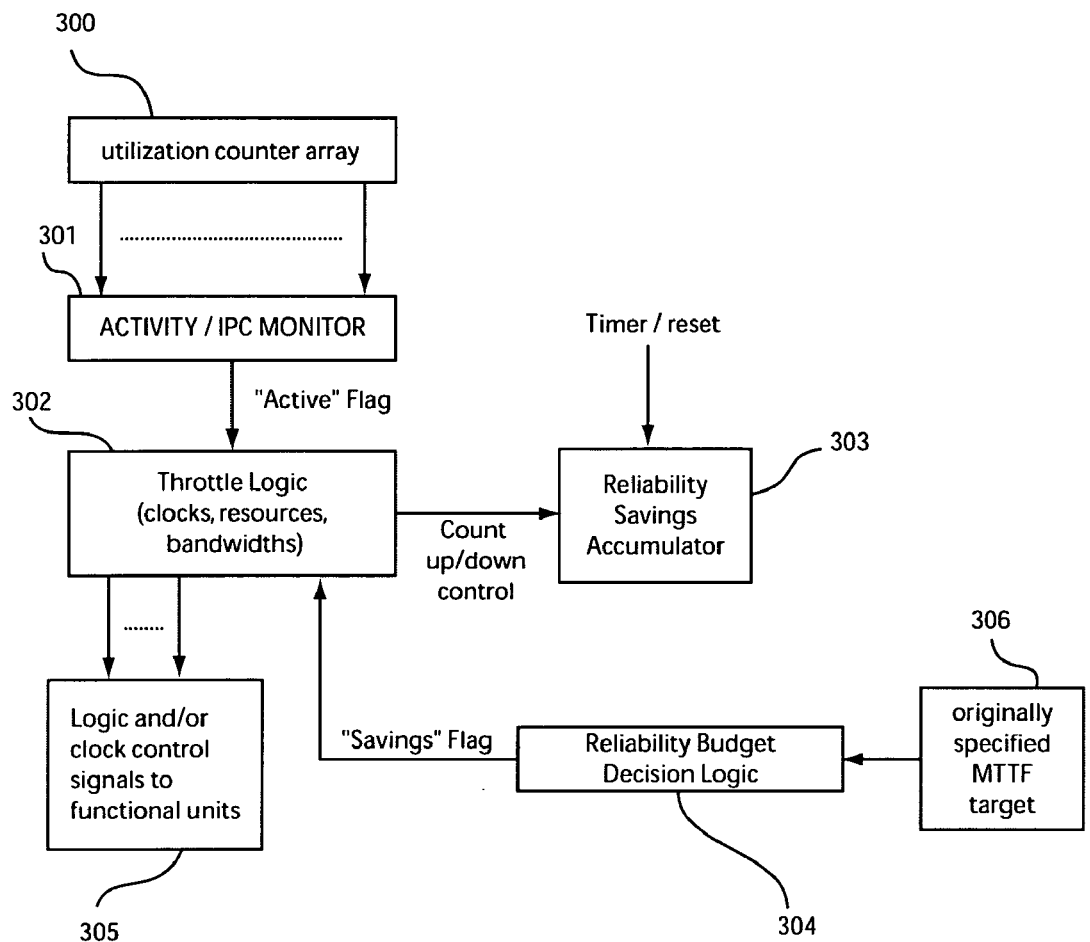
FIG. 3 is a block diagram of another embodiment showing projection and monitoring, for estimating reliability in accordance with the present invention.

Referring to FIG. 3, an illustrative embodiment of the present invention shows an activity/instructions-per-cycle (IPC) monitor 301 used for collecting activity/IPC data and for projecting MTTF or reliability data (e.g., as performed with reference to FIG. 2). In addition, the embodiment employs a reliability savings accumulator 303 and reliability budget decision logic 304.

The reliability savings accumulator 303 (one such embodiment is illustratively shown in FIG. 4) uses data information from the activity/IPC monitor 301 ("active flag") and projects up or down (add or subtract) (e.g. in counter 407 of FIG. 5) the current MTTF reliability value. Reliability budget decision logic 304 makes use of the microprocessor's originally specified MTTF target 306 and current instant data from the reliability savings accumulator 303 in deciding whether the microprocessor's mean time to failure is varying with respect to an earlier specified threshold.

This embodiment also makes use of a throttle logic facility 302, which provides logic and/or clock control signals 305 to the various functional units or regions/structures on chip. The throttle logic 302 is responsible for applying the necessary corrective action for either improving the microprocessor reliability or boosting microprocessor performance. If it is determined that the reliability of an individual region/structure on-chip is deteriorating or there is the danger of a chip-wide reliability deterioration, a "savings" signal or flag (e.g., '0') is sent to the throttle logic 302 to kick off one or more various local or global corrective actions 305.

If it is determined that the processor (e.g., monitor 301 ) is well below and within an acceptable reliability threshold, the embodiment sends a different "savings" signal (e.g., '1') to the throttle logic 302 to apply actions that increase or boost the system performance, and this can either be local or global 305.

Based on the capabilities embedded in the design of the microprocessor or system, examples of such actions may include voltage and/or frequency up and down scaling, job migration from one region to another, work slowdown/reduction in a region/structure, and an increase in the amount of work in a chip region/structure.

Referring to FIG. 4, a truth table 310 of signal states for the exemplary embodiment shown in FIG. 3 is provided. Active signals indicate whether the chip activity meets or exceeds a threshold amount ("1") or is less than the threshold amount ("0") as determined by monitor 301. Savings signals indicate whether the reliability threshold meets or exceeds a threshold amount ("1") or is less than the threshold amount ("0"), as determined by decision logic 304. A speed/resource label is provided given the signal conditions of the active and savings signals, and UP and DOWN signals are determined accordingly as output of throttle logic 302.

Figure 5:
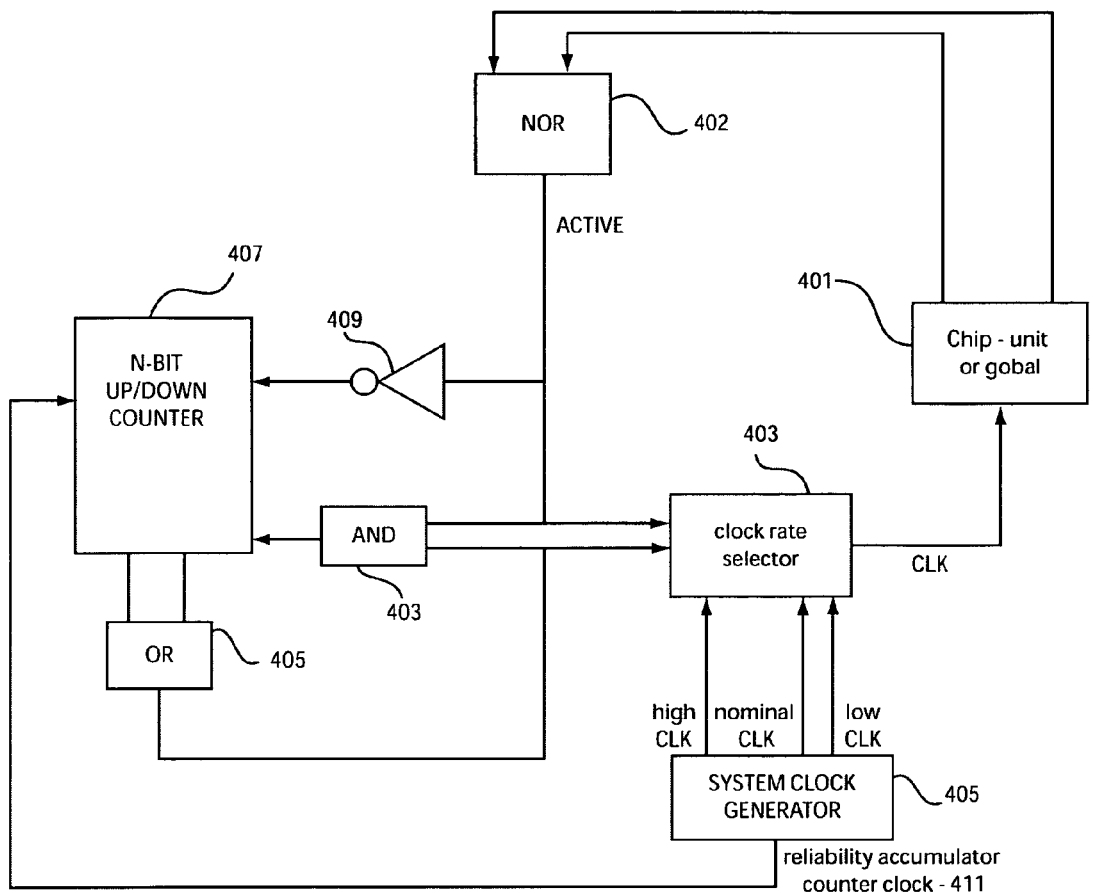
FIG. 5 is a block diagram showing one embodiment of a reliability savings accumulator in accordance with the present invention.

Referring to FIG. 5, an illustrative embodiment of reliability savings accumulator 303 is shown. A system clock generator 405 provides a plurality of different clock signals (e.g., high CLK, nominal CLK and low CLK). In addition, a reliability accumulator counter clock 411 may be provided which is employed to trigger each cycle of the reliability monitoring process. A clock rate selector 403 is responsive to whether chip activity should be increased or decreased based up N-bit up/down counter 407. Counter 407 is controlled by throttle logic 302 (FIG. 3) as to when to record up/down counts. Up/down counts indicate changes to reliability values (e.g., MTTF) by projecting up or down the current MTTF reliability value.

In an illustrative example, when counter 407 indicates that a count threshold has been exceeded, clock rate selector 403 is notified to maintain the clock rate or adjust the clock rate in accordance with one of the plurality of clock signals. Other actions and conditions for regulating reliability are also contemplated.

In addition, the system scans global threshold and unit or local regions in block 401 to determine if reliability thresholds have been exceeded in each region, unit or other discrete area.

Logic devices such as NOR 402, AND 403, OR 405, and inverter 409 may be replaced by other circuit configurations.

Figure 6:
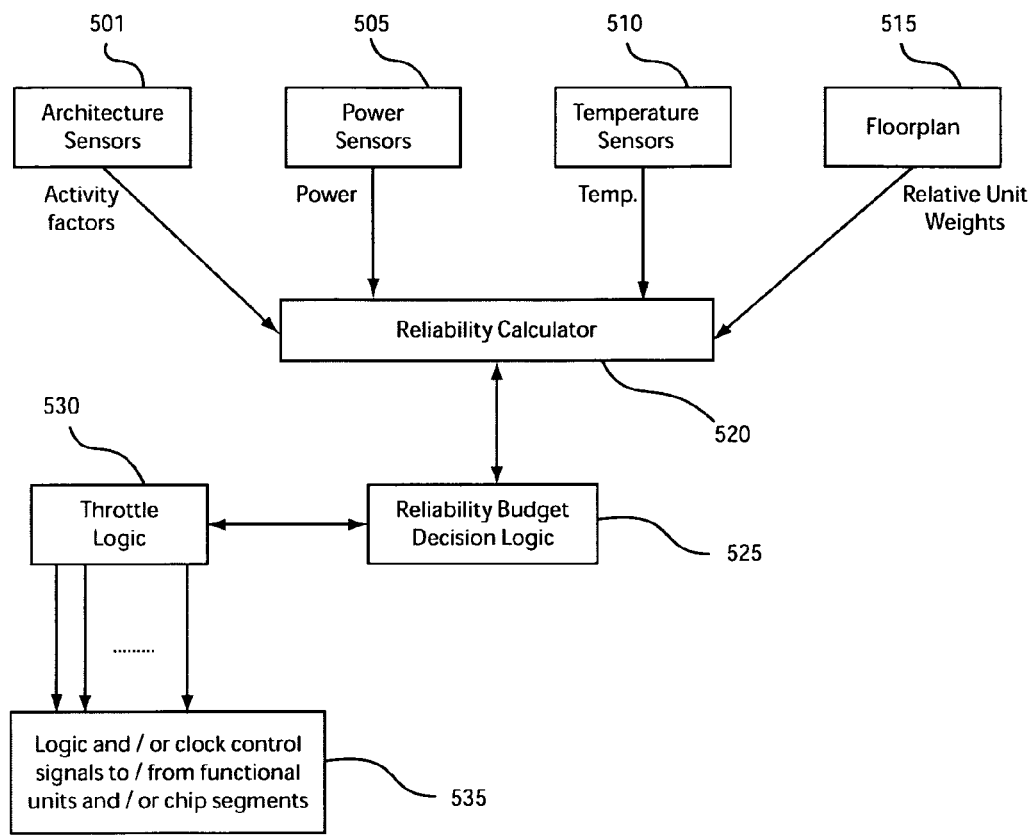
FIG. 6 is a block diagram of yet another embodiment for projection and monitoring for estimating reliability in accordance with the present invention.

Referring now to FIG. 6, another embodiment of the present invention is illustratively shown. A system 500 periodically samples on-chip individual region/structure sensors (e.g., architecture, power, temperature) 501, 505, 510 etc. during workload execution and uses resulting values in collaboration with other embedded reliability determinants like floorplan relative unit weights 515 to estimate individual regional/structure and chip-wide reliability on the fly (as described with reference to FIG. 2). The resulting reliability estimate(s) determined by a reliability calculator 520 are fed into reliability budget decision logic 525 where they are checked against original microprocessor MTTF reliability target(s) to ascertain whether or not an individual region/structure on chip or the whole chip is degrading in reliability or could use an upshot in reliability to improve performance.

Based on the determination, a signal is sent to throttle logic 530, which based on the signal, can invoke a collection of corrective or performance actions 535 or no action at all. Examples or actions may include performing functions in other areas of a chip, adjusting the clock rate, turning on a cooling system, adjusting power globally or locally, etc.

Having described preferred embodiments of a method and apparatus for monitoring and enhancing on-chip microprocessor reliability (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for monitoring a module, which includes one of a chip, integrated circuit printed wiring board and software module, based upon projected reliability, comprising the steps of:

dividing a module into regions;

determining a module-wide reliability projection by performing reliability evaluations for module operations based upon measured operating physical characteristics of the module while the module is operating, the reliability projection including a measure of the reliability of the module based on current operating conditions of the module;

determining a reliability projection in each region;

comparing the reliability projection to a threshold to determine if an action is needed; and in accordance with the comparing step, adjusting operating conditions of the module to modify the reliability projection as feedback for continuing operations in accordance with the threshold.

2. The method as recited in claim 1, wherein the step of determining includes determining one or more of power, temperature, frequency and performance of the module as measurements of the physical characteristics.

3. The method as recited in claim 1, wherein the step of comparing includes comparing the reliability projection to a previously determined reliability projection to determine if an action is needed.

4. The method as recited in claim 1, wherein the measured operating physical characteristics are measured using an instruction per cycle analysis.

5. The method as recited in claim 1, wherein the measured operating physical characteristics are measured by providing counter devices to measure module activity.

6. The method as recited in claim 1, wherein the step of comparing includes comparing the reliability projection for each region to a threshold of that region to determine if an action is needed in that region.

7. The method as recited in claim 6, wherein the step of adjusting operating conditions includes adjusting operating conditions in that region.

8. The method as recited in claim 1, wherein the step of adjusting operating conditions includes adjusting at least one of power, temperature, frequency, and instructions per cycle on the module.

9. The method as recited in claim 1, further comprising the step of providing sensors on the module to make measurements.

10. The method as recited in claim 1, further comprising the step of providing a reliability module on-module to calculate the reliability projection.

11. A program storage device readable by machine, tangibly embodying a program of instructions executable by the machine to perform method steps for monitoring a module, which includes one of a chip, integrated circuit printed wiring board and software module, based upon projected reliability, the method steps comprising:

dividing a module into regions;

determining a module-wide reliability projection by performing reliability evaluations for module operations based upon measured operating physical characteristics of the module while the module is operating, the reliability projection including a measure of the reliability of the module based on current operating conditions of the module;

determining reliability projections in each region;

comparing the reliability projections to a threshold to determine if an action is needed; and in accordance with the comparing step, adjusting operating conditions of the module to modify the reliability projections as feedback for continuing operations in accordance with the threshold.

12. A method for monitoring a module, which includes one of a chip, integrated circuit printed wiring board and software module, based upon projected reliability, comprising the steps of:

dividing the module into regions;

determining reliability projections in each region by performing reliability evaluations based upon measured operating physical characteristics of the module in each region;

comparing the reliability projection in each region to a threshold to determine if an action is needed; and in accordance with the comparing step, adjusting operating conditions of the module.

13. The method as recited in claim 12, wherein the step of determining includes determining one or more of power, temperature, frequency and performance of the module as measurements of the physical characteristics.

14. The method as recited in claim 12, wherein the step of comparing includes comparing the reliability projection to a previously determined reliability projection to determine if an action is needed.

15. The method as recited in claim 12, wherein the measured operating physical characteristics are measured using an instruction per cycle analysis.

16. The method as recited in claim 12, wherein the measured operating physical characteristics are measured by providing counter devices to measure module activity.

17. The method as recited in claim 12, wherein the step of comparing includes comparing the reliability projection for each region to a threshold of that region to determine if an action is needed in that region.

18. The method as recited in claim 17, wherein the step of adjusting operating conditions includes adjusting operating conditions in that region.

19. The method as recited in claim 12, wherein the step of adjusting operating conditions includes adjusting at least one of power, temperature, frequency, temperature, and instructions per cycle on the module.

20. The method as recited in claim 12, further comprising the step of providing sensors on the module to make measurements.

21. The method as recited in claim 12, further comprising the step of providing a reliability modtde on-module to calculate the reliability projection.

* * * * *